United States Patent
Kachouh et al.

(10) Patent No.: US 7,453,350 B2
(45) Date of Patent: Nov. 18, 2008

(54) TIRE PRESSURE MONITORING SYSTEM TRANSMISSION PROTOCOL

(75) Inventors: Patricia Kachouh, Troy, MI (US); Tejas B. Desai, Sterling Heights, MI (US); Kurt VanDrus, Macomb, MI (US)

(73) Assignee: Continental Automotive Systems US, Inc., Auburn Hills ( * ) Notice: Subject to any disclaimer, the term of this patent is extended or adjusted under 35 U.S.C. 154(b) by 31 days.

(21) Appl. No.: 11/471,386

(22) Filed: Jun. 20, 2006

(65) Prior Publication Data

US 2006/0238324 A1    Oct. 26, 2006

Related U.S. Application Data

(63) Continuation of application No. 10/298,058, filed on Nov. 15, 2002, now Pat. No. 7,095,316.

(60) Provisional application No. 60/336,265, filed on Nov. 15, 2001.

(51) Int. Cl.
*B60C 23/02* (2006.01)

(52) U.S. Cl. .......... 340/442; 340/447; 340/5.6; 340/5.64; 340/825.58; 340/825.69; 73/146.2

(58) Field of Classification Search .......... 340/442, 340/447, 5.6, 5.61, 10.1, 10.2, 10.5, 5.64, 340/825.58, 825.69; 73/146.2
See application file for complete search history.

(56) References Cited

U.S. PATENT DOCUMENTS

| | | | | |
|---|---|---|---|---|
| 5,602,524 | A * | 2/1997 | Mock et al. | 340/447 |
| 6,034,596 | A * | 3/2000 | Smith et al. | 340/447 |
| 6,292,096 | B1 * | 9/2001 | Munch et al. | 340/445 |
| 6,535,116 | B1 * | 3/2003 | Zhou | 340/447 |
| 6,580,364 | B1 * | 6/2003 | Munch et al. | 340/447 |
| 6,591,671 | B2 * | 7/2003 | Brown | 73/146.5 |

* cited by examiner

*Primary Examiner*—Davetta W. Goins

(57) ABSTRACT

A system for monitoring conditions within a tire includes a sensor assemblies (14). The sensor assemblies (14) emit a transmission (26) containing information indicative of conditions within a tire to a receiver (16). The transmission (26) from the sensor assemblies (14) includes an amplitude shift key wake up portion and various data packet portions. The data packet portions are separated by a variable interval to prevent collisions of transmissions at the receiver.

6 Claims, 4 Drawing Sheets

TIRE PRESSURE MONITORING SYSTEM TRANSMISSION PROTOCOL

CROSS REFERENCE TO RELATED APPLICATION

The present invention is a continuation of U.S. patent application Ser. No. 10/298,058, filed Nov. 15, 2002, which claims priority to U.S. Provisional Patent Application Ser. No. 60/336,265 filed Nov. 15, 2001.

BACKGROUND OF THE INVENTION

This invention relates to a system for monitoring conditions within a tire, and specifically to a transmission signal protocol for information transmitted from a tire pressure-monitoring sensor within the tire.

Current government regulations have established that tire pressure must be monitored to provide a vehicle operator with information warning of improper tire conditions. Notification of tire conditions aids in maintaining optimal tire operating parameters that in turn improves safety and handling of the motor vehicle. Further, monitoring of conditions within a tire allows the operator to maintain tire pressure within an optimal range, to optimize fuel economy, vehicle handling, performance and safety.

Conventional methods of monitoring tire pressure include positioning a sensor assembly within each wheel to monitor pressure, temperature and other conditions effecting tire performance. The sensor assemblies disposed within each tire gather transmit a radio frequency transmission containing data indicative of tire conditions. The transmission is received by a receiver disposed within the vehicle that provides information to a controller. The tire pressure data transmitted to the receiver is then displayed to the driver with information required to warn of improper conditions or to provide specific numerical data for conditions within the tire.

The sensor assemblies disposed within each of the tires are operated by a battery. Because the battery is disposed within the tire and access to the battery requires removal of the tire, it is desirable to reduce and minimize the power required to operate this sensor and transmit the data signal to the receiver. It is desirable to develop a system and protocol for transmitting the signal and data to the receiver depending on various conditions of the vehicle to prolong battery life.

Accordingly, it is desirable to develop a transmission protocol for the tire pressure monitoring system that extends battery life by transmitting data indicative of tire conditions to a receiver according to specific vehicle operating parameters.

SUMMARY OF THE INVENTION

An embodiment of this invention is a transmission protocol for a tire pressure monitoring system transmitted from a sensor disposed within each of the tires that senses conditions indicative of tire pressure and temperature.

The transmitter disposed within the tire receives data from the sensor within the tire and transmits that data to a receiver according to a desired transmission protocol. The data transmission protocol includes a preamble portion. The preamble portion includes an Amplitude Shift Keyed (ASK) wakeup signal. The data portion of the transmission is a Frequency Shift Keyed (FSK) signal. The ASK wakeup signal signals the receiver and indicates that the data portion of the transmission will follow.

The receiver is initial configured to receive ASK signals. Each transmission from the tire pressure monitoring sensor assembly includes the preamble portion and ASK signal that triggers the receiver to switch to receive FSK mode. In the FSK mode, the data packet portions containing data indicative of tire conditions is received by the receiver.

The transmission from the sensors includes data indicative of tire pressure; tire temperature and other conditions within the tire. Further, data transmitted by the sensor assembly includes various checks to ensure and check operation of the sensor assembly.

The transmission protocol for the tire pressure monitoring system of this invention conserves battery power and efficiently provides information indicative of conditions within a tire according to specific vehicle operating conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
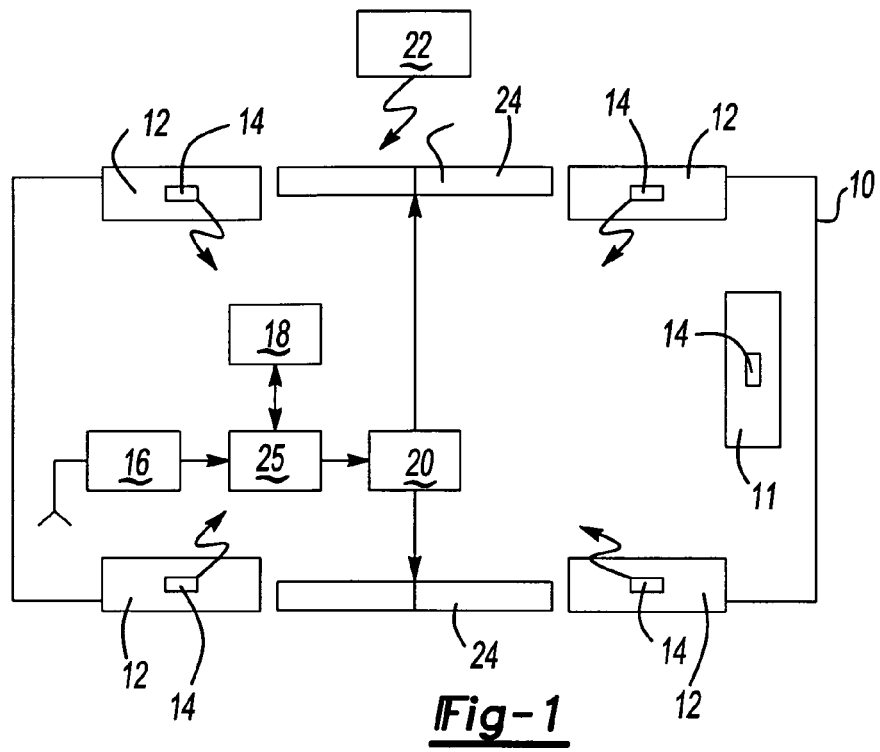
FIG. 1 is a schematic view of a motor vehicle including a tire monitoring and remote keyless entry system.

Referring to FIG. 1, an embodiment of this invention is a system for monitoring conditions within tires 12, mounted to a motor vehicle 10. A motor vehicle 10 includes at least four tires 12, each including a sensor assembly 14. In some instances, a spare tire 11 also includes a sensor assembly 14 to eliminate the need for exchanging sensor assemblies 14 for a deflated tire. The spare tire 11 also include a sensor assembly 14 in order to provide the required data tire conditions for the spare tire 11 during its use as a replacement for one of the other tires 12. Further, the sensor assembly 14 within the spare tire 11 transmits information indicative of tire conditions at least once a day, or anytime pressure goes low. The sensor assemblies 14 disposed within each of the tires 12, 11 may be of any type known to a worker skilled in the art. Typically, the sensor assemblies 14 are installed as a portion of an air inlet valve to each of the tires 12, 11 and include a sensor assembly to sense temperature and pressure within each of the tires 12, 11. Each of the sensor assemblies 14 is powered by a battery and transmits signals to a receiver 16 indicative of condition with the tires 12, 11 according to a specific protocol to extend battery life.

The tire pressure monitoring system includes a receiver 16 that receives signals from the sensor assemblies 14 within the tires 12, 11 and forwards that information to a micro-controller 25. The micro-controller 25 then sends the signal to a display 18 to communicate information to the operator. The receiver 16 may also receive a signal from a key fob 22 to activate a remote keyless entry system 20. The remote keyless entry system 20 controls locks on doors 24 or may also be used to engage other functions of the motor vehicle 10. As appreciated, operation of a remote keyless entry system 20 is as known to a worker skilled in the art and may operate many other functions of the motor vehicle 10.

Figure 2:
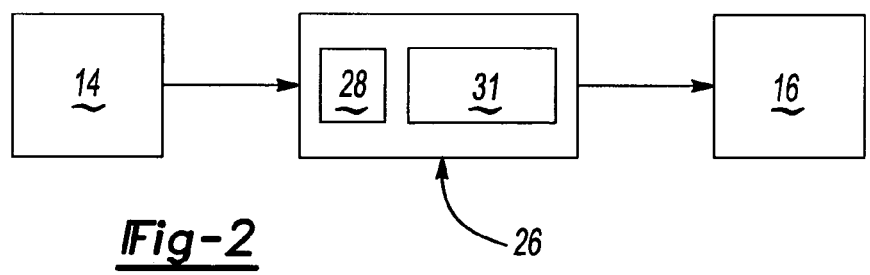
FIG. 2 is a schematic view of the elements comprising a transmission from the tire sensor assembly.

Referring to FIG. 2, the components of a transmission signal 26 is schematically illustrated. Transmission signal 26 emitted from the tire sensor 14 includes a transmission preamble portion 28, followed by data packet portions 31. The transmission signal 26 from the tire pressure sensor 14 is transmitted to the receiver 16. Each of these portions includes specific information indicative of conditions within the corresponding tire 12, 11.

Figure 3:
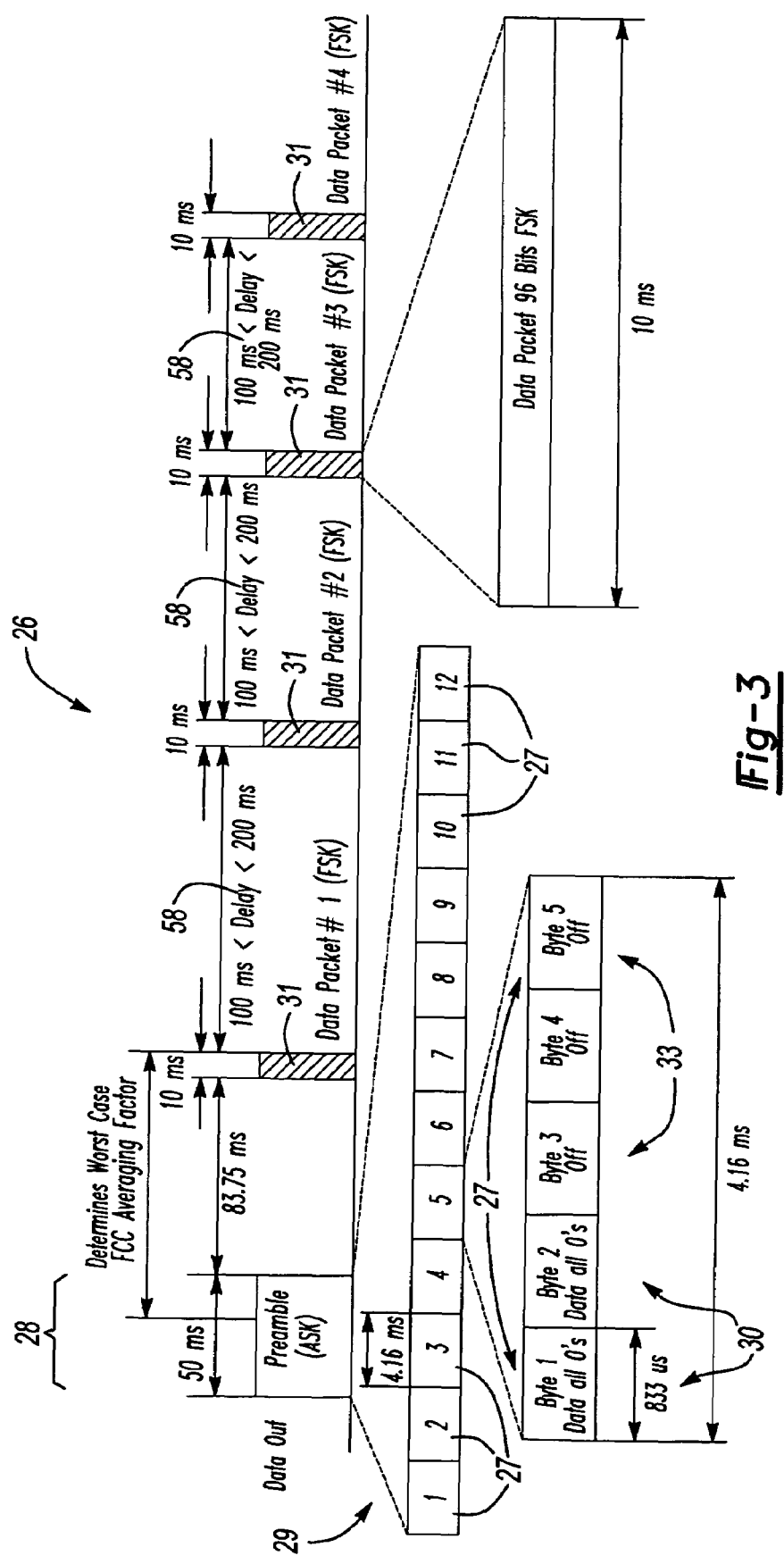
FIG. 3 is a schematic view of the transmission signal including variable intervals.

Referring to FIG. 3, the transmission preamble portion 28 includes an amplitude shift key (ASK) wakeup signal 29. The ASK signal 29 initiates the receiver 16 to change over from ASK mode to FSK mode. The ASK mode is the mode that is used for the remote keyless entry system 20. The ASK mode is most desirable for transmissions that require high power and not subject to variations in distance between the receiver 16 and the transmitter 22. Further, the ASK signal 29 is best suited for transmissions where the transmitter and receiver are essentially stationary relative to each other.

The ASK signal 29 is composed a plurality of data packets 27 of a specific pattern. Preferably, there are twelve identical packets 27, each including five bytes. The first two bytes, indicated at 30, are of a data value of "0". The remaining bits, indicated at 33 are off. Each packet is 4.16 ms long. The specific pattern is selected to minimize the duty cycle of the wakeup pattern to allow the highest averaging factor possible in view of local restrictions.

Each data transmission 26 includes a number of data packets 31 separated by a variable interval 58. Each data packet 31 contains ninety-six bits transmitted in FSK format that is 10 ms in duration. The variable interval 58 separating the data packets 31 reduces and substantially eliminates the probability that transmissions 26 from other sensor assemblies 14 will overlap at the receiver 16. The receipt of two or more data packets 31 simultaneously overlapped is known as a data collision. The receiver 16 will not recognize transmissions 26 collided or overlapped because the overlapped data frames are of a greater duration than the receiver 16 is programmed to receive. Overlapping data frames 31 causes a receiver 16 to ignore the data frames 31. Repeated data collisions will eliminate data from at least two of the data sensor assemblies 14.

Figure 4:
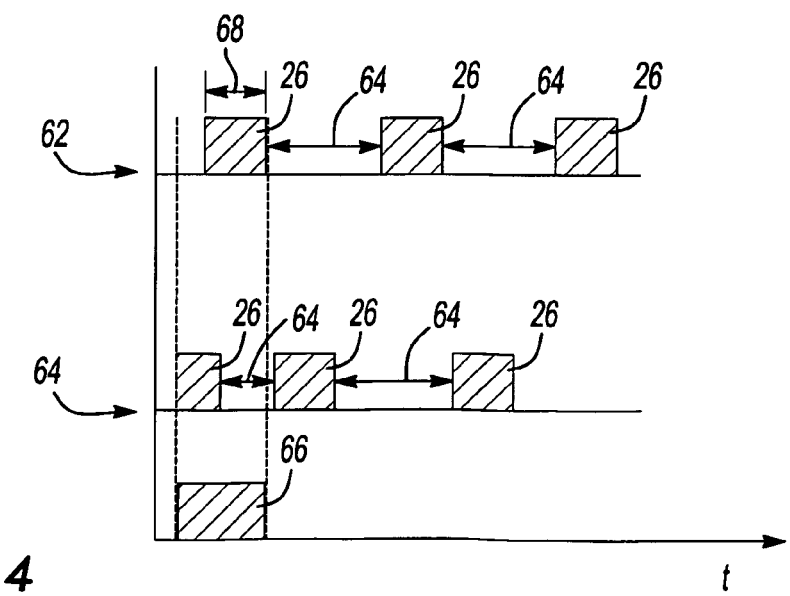
FIG. 4 is schematic illustration of data transmissions transmitted at variable intervals.

Referring to FIG. 4, each data signal 26 includes a duration 68. Between each data signal is an interval 64. The interval 64 is of a fixed duration than the data transmission 26 would be repeated and result in a transmission 66 of increased duration. As appreciated, when the receiver 16 receives a transmission of increased duration 66 it will simply ignore it because it is of a different length than that than which the receiver 16 is programmed to receive. The receiver 16 is programmed to receive signals of certain duration in order to ensure that the receiver 16 is actually receiving information from tire pressure monitoring assemblies 14 disposed on that vehicle. Further, the receiver 16 also only responds to signals of a certain duration in order to prevent interference and confusion that may be caused by overlapping signals.

Referring to FIG. 3, the system of this invention includes a method of preventing repeated data collision. The sensor assemblies 14 of this invention prevent overlapping data frames 31 by varying the predetermined intervals 58 between the data packets 31 in a random manner. The length of the data frame 31 is preferably 10 milliseconds with the interval 58 varying according to the below equation.

Interval length=standard length+(beta*standard length)

Where: interval length is the length of time in ms between data frames;
 i. Standard length is a predetermined duration of time in ms; and
 ii. Beta is a random variable with a value between 0 and 1.

Preferably, the standard length of time is 100 milliseconds; therefore, the interval length will vary between 100 milliseconds and 200 milliseconds depending on the value of beta. Each transmission 26 from the sensor assemblies 14 are set with differing variable intervals 58, such that even if one or more data packets 31 overlap for any one transmission, subsequent data packets 31 will not overlap thereby preventing cyclical or repeated overlap. As appreciated differing lengths of data, frames are within the contemplation of this invention and a worker skilled in the art would recognize the application of this method to other lengths of data transmissions.

In another embodiment of this invention, the length of the variable interval 58 is transmitted to the receiver assembly 16. The receiver assembly 16 will then expect the next data packet 31 at the communicated interval. This allows a receiver assembly 16 to switch back to the ASK receiver between data frames 31. This is known in the art as interleaving and is preferable in systems using a remote keyless entry system and a tire pressure monitoring system that share a common receiver. In this way, the common receiver can receive remote keyless entry signal data and tire pressure-monitoring data without creating periods of blackouts for either system.

Another factor considered in preventing signal collision is the transmission rate. The faster a rate the data is transmitted to the receiver the lower the probability of data collision. Preferably, the system of this invention includes a rate of 9.6 killibauds. However, a worker skilled in the art would understand that different data transmission rates are within the contemplation of this invention as would be required by specific regulations in specific areas.

Figure 5:
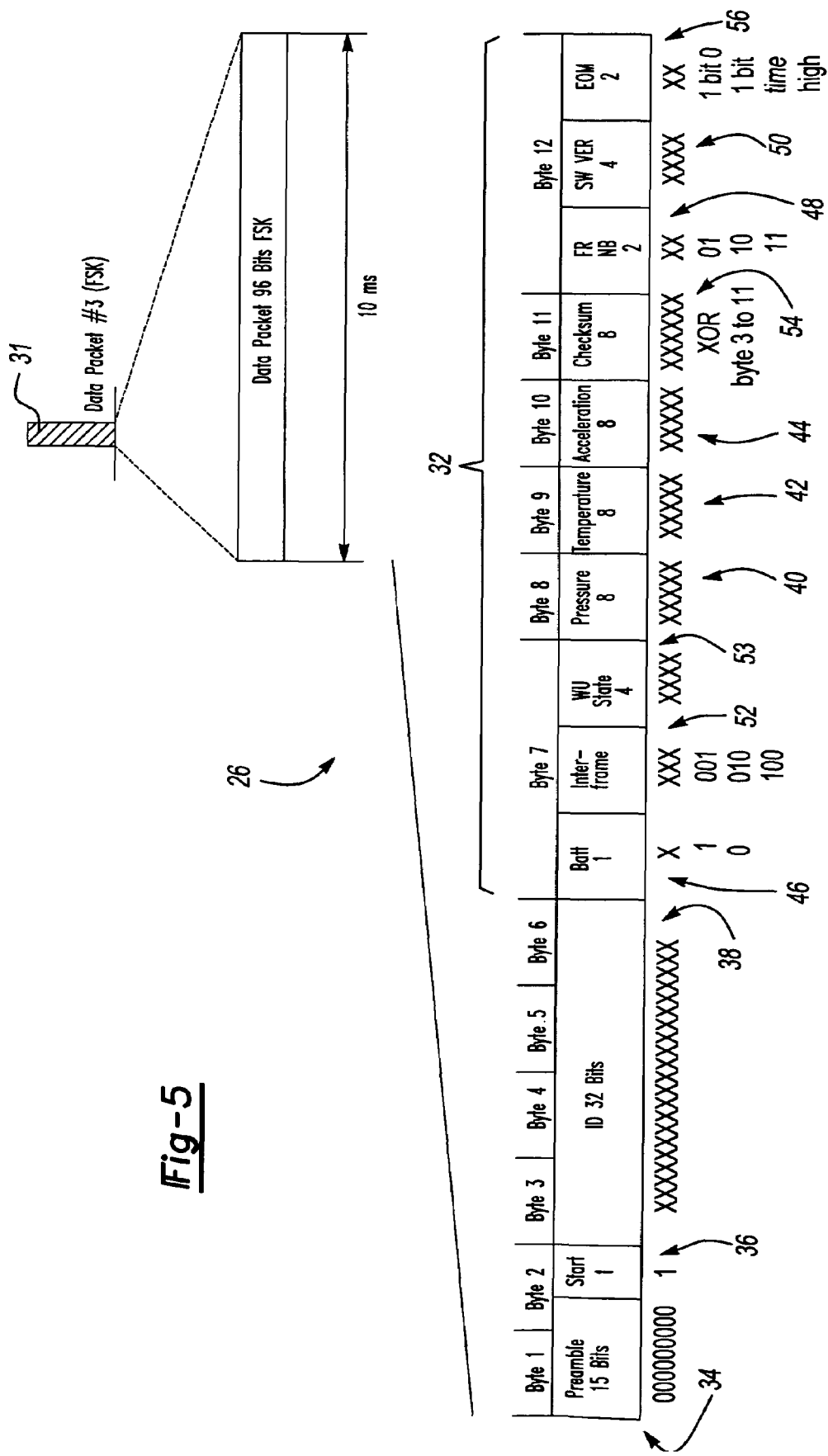
FIG. 5 is a schematic illustration of a transmission signal including information indicative of tire conditions.

Referring to FIG. 5, each data packet 31 includes a data packet preamble portion 34, an identification portion 38 and the data portion 32. Each of those portions is divided into specific elements having specific purposes relevant to the transmission 26. The preamble portion 29 includes the fifteen bits containing "zero" bits terminated by a start bit 36 with a value of Data "one.

The identification portion 38 includes thirty-two identification bits. The identification bits include various data including product identification and other information that would indicate the position of the sensor on the specific vehicle relating to the receiver 16. The identification bits provide information on the specific product serial number and identification information used by the receiver 16 to differentiate tire pressure monitoring transmissions emitted from the vehicle from other vehicles that may be in the same proximity to the receiver 16.

A data portion indicated at 32 includes pressure information, temperature information, status information and other information that relays the present condition of the sensor assembly 14. The pressure information indicated at 40 includes eight bits that indicate pressure within the tire 12, 11. The eight bits are calibrated to a specific zero pressure and indicate any deviation from that zero pressure. Preferably, the zero pressure is 14.7 pounds per square inch (PSI). Changes from this zero pressure are indicated by the ten bits that make up the pressure data portion of the data portion indicated at 32 and will register changes in pressure from zero pressure in 0.11-PSI increments. The maximum pressure that the pressure bits will indicate is 12,115 PSI.

A next data portion indicated at 42 includes information indicative of temperature within the tires 12, 11. The temperature and data portion includes eight bits. The eight bits include a specific value indicative of change from a zero point. Preferably, the zero point in this system is −40° C. and changes in 1° C. increments from the zero point are indicated by the values of the eight bits and the temperature portion of the data packets 42.

A next data portion indicated at 44 includes eight bits providing an indication of acceleration. The eight bits indicated at 44 defines acceleration. Another bit includes information on the status the battery and is indicated at 46. A "0" value indicates that the battery is at a normal level and a value of "1" indicates that the battery is at a low level.

A frame number bit indicated at 48 provides information as to what number data packet is currently being transmitted. As shown in FIG. 3, there are four data packets for each transmission 26. The frame number bits 48 simply indicate which data packet is currently being transmitted.

Four bits indicated at 50 provide software version information. The software version information 50 provides information used in programming the receiver and also in determining the proper operation of the tire pressure monitoring system. Further, many other uses as is known to a worker skilled in the art are would be communicated by information indicative of the software version.

Three bits indicated at 52 include information concerning the delay time between data packets 31. The time between data packets is calculated according to a specific algorithm and communicated to the receiver 16, in order for the receiver 16 to expect further transmission of the data from specific sensor and predetermined time based on the variable interval 58.

The wake up status bit section provides a code indicated at 53. The code bits transmit information and are arranged to transmit and provide information to the receiver 16 that the sensor assembly 14 is in a learn mode, normal mode, over temperature mode, wake mode or a forced transmission mode. Further, the wake up status information bits 53 can be used for other purposes and to indicate other modes of operation of the sensor assembly. The learn mode is indicated by all of the bits having a value of "1111". A learn mode is when the sensor assembly 14 is triggered to transmitting identification code indicative of the specific sensor to a receiver in order for the receiver to learn the specific location of the sensor assembly on the motor vehicle.

In a normal mode, the sensor assembly is operating under normal conditions to send transmissions indicative of tire conditions to the receiver at the predetermined intervals. The normal mode is indicated by the four bits including a value of "0001".

The over temp mode indicates a condition where the temperature has increased over a predetermined and pre-selected temperature. The over temp mode is indicated by a bit value of "0010".

The wake function code indicates that the sensor assembly is now rotating and has moved from a parked condition to an operating condition. This wake function code bit has a value of "0011". The wake is used to indicate and detect whether the vehicle is parked or in operation.

The forced transmission bit is indicated by a value of "0100". The forced transmission function code indicates that the sensor assembly has been externally activated to transmit data indicative of tire conditions. Sensor assemblies are externally triggered to transmit data indicative of tire conditions when it is desired to teach the receiver the position of each of the sensor assemblies. In other words, a magnet or other device may be used to trigger transmission of a data signal from a specific sensor 14 in order for the receiver to learn which sensor belong to that vehicle and at what location such as left front, right front or other position on the vehicle that the sensor is located.

In a normal mode, the sensor assembly is operating under normal conditions to send transmissions indicative of tire conditions to the receiver at the predetermined intervals. The normal mode is indicated by the five bits including a value of "0001".

The check sum information indicated at 54 includes eight bits that are arranged to represent the sum of all of the bits. Check sum includes all of the bits except for the preamble bits. This includes a bit stream of 58 bits. When the stream of bits is split into pairs of bits, it includes a series of zeros and ones that can be converted to a decimal equivalent. Each pair is converted to a decimal equivalent and then each pair is added to all of the other pairs. The sum of all the decimal values is then indicated in binary form at the check sum bit. This binary form acts as a check of the data signal to the receiver to ensure that all of the data bits have been received and that the receiver has in fact received a complete signal. Check sum data bit will change as values of the data packets and other function signals within the transmission change.

The final bit is indicated at 56 as a stop bit. This signifies that the data packet transmission by sending a Manchester data "0" followed by one bit time high. The Manchester data "0" is part of the Manchester code. The Manchester code, known by workers skilled in the art is a coding in which data and clock signals are combined to form a single self-synchronizing data string. Each included bit contains a transmission at the mid-point of a bit. The direction of the transition determines whether a bit is a "0" or a "1". In the first half is a true bit value and the second half is the complement of the true bit value. The stop bit signifies the end of the data packet transmission from this specific transmission.

Figure 6:
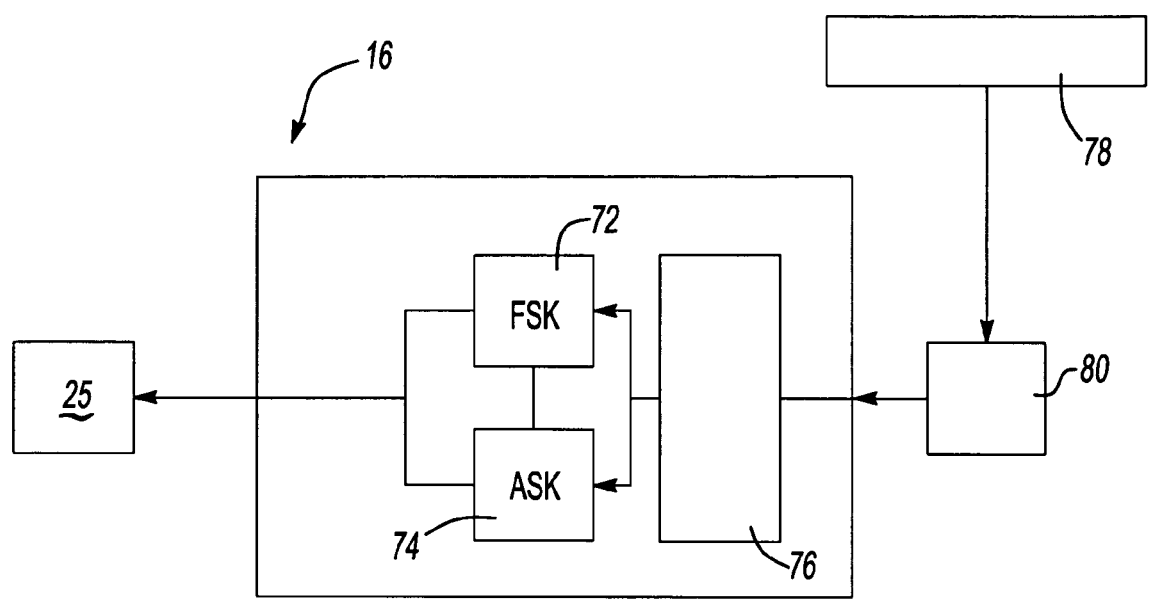
FIG. 6 is a schematic illustration of a receiver assembly.

Referring to FIG. 6, the receiver assembly 16 includes an ASK portion 74 and an FSK portion 72. The receiver assembly 16 also includes an antenna 78 to receive transmissions from the key fob 22 and the sensor assemblies 14. The antenna 78 is preferably of a length one quarter that of the wavelength of the transmission received. Transmissions received by the antenna 78 proceed through a resistor 80 to the RF receiver 16. A controller 76 controls whether the ASK portion 74 or the FSK portion 72 is engaged to receive incoming transmissions.

The receiver 16 defaults to sending transmissions to the ASK portion 74 of the receiver 16. The ASK portion 74 operates at a low power and is therefore the default when the receiver 16 is activated. The ASK portion 74 is engaged while the motor vehicle 10 is stopped or parked. Preferably, the ASK receiver 74 is engaged in response to the speed of the motor vehicle 10 being below a predetermined speed. The predetermined speed is preferably below 10 miles an hour. Above 10 miles, an hour the receiver assembly 16 will change over to the FSK portion 72. That is, that any signals received by the receiver 16 at that time will be automatically directed to the FSK portion 72 of the receiver. The FSK portion 72 will then receive transmissions from the sensor assemblies 14 disposed within each of the tires 12, 11.

The conditions of the motor vehicle 10, whether it is traveling at the desired speed or is parked, provide definite indicators on whether the FSK portion 72 or the ASK portion 74 are the default receiver for incoming transmissions. However, when the vehicle 10 is idling, for instance in a traffic jam, but not moving at a speed causing switch over to FSK portion 72 the system will not switch over to the FSK portion 72 unless another condition is satisfied. Each transmission includes the ASK wake up signal 28 that is sent before the FSK data packets 31 (FIG. 2) transmission. The ASK wake up signal 28 alerts the receiver assembly 16 to the incoming FSK transmission which causes the receiver assembly 16 to switch over to the FSK portion 72. The switchover allows the receiver assembly 16 to accept data indicative of tire condition from the sensor assemblies 14 while the automobile is parked or idling in traffic.

Preferably, each of the sensor assemblies 14 will transmit signals indicative of tire conditions at differing rates depending on the speed of the motor vehicle. At speeds above a predetermined speed the sensor assembly will transmit the tire condition data at a greater frequency. At lower speeds indicative of a parked vehicle, the sensor assemblies 14 transmit at a lower rate. Preferably, the predetermined speed is 10 miles an hour and the sensor assemblies 14 will transmit signals indicative of tire conditions once every minute. Below the ten miles per hour predetermined speed threshold, the sensor assemblies 14 will transmit the signals only after sensing a change in tire pressure above a desired amount indicative of a tire losing air pressure. Once an initial loss of pressure is sensed, the sensor assemblies 14 are triggered to transmit signals at one-minute intervals.

Although specific speeds and intervals of data transmission are discussed, a worker knowledgeable in the art would understand that it is within the contemplation of this invention to use the other speeds and data transmissions and rules according to specific application criteria. The selective actuation of each sensor assembly 14 and switching between ASK portion 74 and FSK portions 72 of the receiver 16 prevents signal collisions between ASK and FSK transmission emitted by the remote keyless entry system 20 and signals form the sensors 14 to optimize function of the receiver assembly 16.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of transmitting information indicative of conditions within a tire comprising the steps of:
   a. transmitting a signal including an amplitude shift keyed transmission preamble to a receiver;
   b. transmitting a frequency shift keyed (FSK) identification code from a first transmitter;
   c. transmitting a fsk signal indicative of pressure within the tire from the first transmitter;
   d. transmitting a fsk signal indicative of temperature within the tire from the first transmitter,
   e. varying a time interval between portions of said identification code, said signal indicative of pressure within the tire, and said signal indicative of temperature within the tire; and
   f. receiving one of a frequency shift keyed (FSK) identification code, an FSK signal indicative of pressure within a tire, and an FSK signal indicative of a temperature within a tire from a second transmitter within the time interval between portions of any of the FSK signals from the first transmitter.

2. The method of claim 1, wherein said step of varying said time interval includes transmitting a length of the interval to a receiver such that the receiver prepares to receive a next data packet at the communicated time interval.

3. The method of claim 2, wherein said time interval varies in response to vehicle operating parameters.

4. The method of claim 3, wherein said operating parameter includes vehicle speed, and a frequency of said transmissions are increased in response to an indication of pressure loss at a pre-selected rate.

5. The method of claim 4, wherein said frequency of said transmissions are decreased in response to a vehicle not moving for a set period.

6. The method of claim 5, wherein said frequency of said transmissions varies according to vehicle speed.

* * * * *